(12) United States Patent
Broad et al.

(10) Patent No.: US 7,369,047 B2
(45) Date of Patent: May 6, 2008

(54) ADAPTIVE SENSING NETWORK

(75) Inventors: Alan S. Broad, Palo Alto, CA (US); Michael A. Horton, Santa Clara, CA (US)

(73) Assignee: Crossbow Technology, Inc., San Jose, CA (US)

( * ) Notice: Subject to any disclaimer, the term of this patent is extended or adjusted under 35 U.S.C. 154(b) by 177 days.

(21) Appl. No.: 11/096,098

(22) Filed: Mar. 30, 2005

(65) Prior Publication Data

US 2006/0226990 A1 Oct. 12, 2006

(51) Int. Cl.
*G08B 13/14* (2006.01)

(52) U.S. Cl. .............................. 340/572.1; 340/573.1; 340/10.1; 705/22; 235/385; 370/254; 370/310

(58) Field of Classification Search .............. 340/573.1
See application file for complete search history.

(56) References Cited

U.S. PATENT DOCUMENTS

| | | | | |
|---|---|---|---|---|
| 4,002,886 A | * | 1/1977 | Sundelin .................... | 340/5.91 |
| 4,766,295 A | * | 8/1988 | Davis et al. ................ | 340/5.91 |
| 5,640,151 A | * | 6/1997 | Reis et al. ................ | 340/572.1 |
| 5,697,061 A | * | 12/1997 | Krueger et al. ............. | 340/825 |
| 5,841,365 A | * | 11/1998 | Rimkus .................. | 340/825.52 |
| 5,995,015 A | * | 11/1999 | DeTemple et al. ..... | 340/825.49 |
| 6,381,467 B1 | * | 4/2002 | Hill et al. .................... | 455/519 |
| 6,745,027 B2 | * | 6/2004 | Twitchell, Jr. ........... | 455/422.1 |
| 6,749,116 B2 | * | 6/2004 | Massaro .................... | 235/383 |
| 6,750,769 B1 | * | 6/2004 | Smith ...................... | 340/572.1 |
| 6,844,821 B2 | * | 1/2005 | Swartzel et al. ......... | 340/572.1 |
| 6,961,709 B2 | * | 11/2005 | Goodwin, III ............... | 705/22 |
| 7,090,125 B2 | * | 8/2006 | Goel et al. .................. | 235/383 |
| 7,152,040 B1 | * | 12/2006 | Hawthorne et al. ......... | 340/522 |
| 2005/0218218 A1 | * | 10/2005 | Koster ........................ | 235/383 |
| 2005/0237153 A1 | * | 10/2005 | Chen ......................... | 340/5.91 |
| 2006/0176239 A1 | * | 8/2006 | Sweeney .................... | 345/1.2 |
| 2006/0187040 A1 | * | 8/2006 | Sweeney ................. | 340/572.1 |

* cited by examiner

*Primary Examiner*—Benjamin C. Lee
*Assistant Examiner*—Eric M. Blount
(74) *Attorney, Agent, or Firm*—Fenwick & West LLP

(57) ABSTRACT

A plurality of modules interact to form an adaptive network in which each module transmits and receives data signals indicative of radio-frequency identification signals, and indicative of proximity sensing at the module. A central computer accumulates the data produced or received and relayed by each module for analyzing inventory, pricing and customer responses to transmit through the adaptive network signals representative of information to be displayed at selectively-addresses modules in response to computer analyses of the data accumulated from modules forming an adaptive network.

5 Claims, 4 Drawing Sheets

ADAPTIVE SENSING NETWORK

FIELD OF THE INVENTION

This invention relates to adaptive networks and more particularly to networks of individual modules that sense presence of objects and adaptively assemble communication links to a main computer for transmitting and receiving data signals associated with quantities of objects, pricing of objects, customer response times, and the like.

BACKGROUND OF THE INVENTION

Retail establishments have long needed capability to conduct real-time inventory management, and to adjust prices of objects offered for sale on the bases of demand, available supplies, promotional tenders, and the like. Prior retailing practices relied upon manual counting of available objects for periodic inventory checks and upon manual re-marking of prices as demand and available supplies and promotional tenders required.

Such practices were notoriously slow and expensive, and have been replaced to some extent by computerized management of such information based upon object data collected during check-out procedures.

Such computerized management commonly entails sensing identity of an object via product identity codes that are communicated from a point-of-sale terminal to a main computer for analysis against a database of all such objects for current pricing, adjustment of inventories of sold objects, and the like. However, such computerized management is delayed from the time of removal from a stock of objects to the time of check-out, and does not address changing the posted prices at which objects may be selected for purchase.

One innovation that proposes to improve such computerized management includes electronic shelving that replaces passive storage shelving and includes various electronic sensors and displays which are permanently wired into a main computer for determining when a supply of an object is depleted and for posting pricing and unit valuations, and the like, on built-in computer-controlled displays. Such innovative shelving requires power and data cabling, major expenditures for such shelving as capital expenditures, and has generally not been widely successful in retailing operations that operate on low profit margins. In addition, retailing operations desire to know about buying behavior of customers including such characteristics as time spent examining an object and then buying or not buying that object, since such behavior promotes analyses of appropriate real-time pricing, appeal of a display of selected objects, and the like.

SUMMARY OF THE INVENTION

In accordance with one embodiment of the present invention, a plurality of networked independent product modules may be deployed on storage shelves of objects to sense selected parameters and adaptively assemble a network of such modules to communicate the sensed parameters to a main computer. Each such networked product module includes a sensor of radio-frequency identity (RFID) chips on objects thus tagged and assembled in the vicinity of the module. In addition, each such module may include an infrared radiation sensor or proximity sensor, or the like, and a processor for manipulating the sensed data to transmit and receive data communications between adjacent modules. In addition, each module has a unique address or identity code and includes a display under control of the processor for communicating selected messages about adjacent objects such as description, price and unit value information. The modules are self powered by installed batteries and/or photovoltaic arrays to relay sensed information between modules in an adaptive network array that communicates data exchanges between a main computer and each such module.

DETAILED DESCRIPTION OF THE INVENTION

Figure 1:
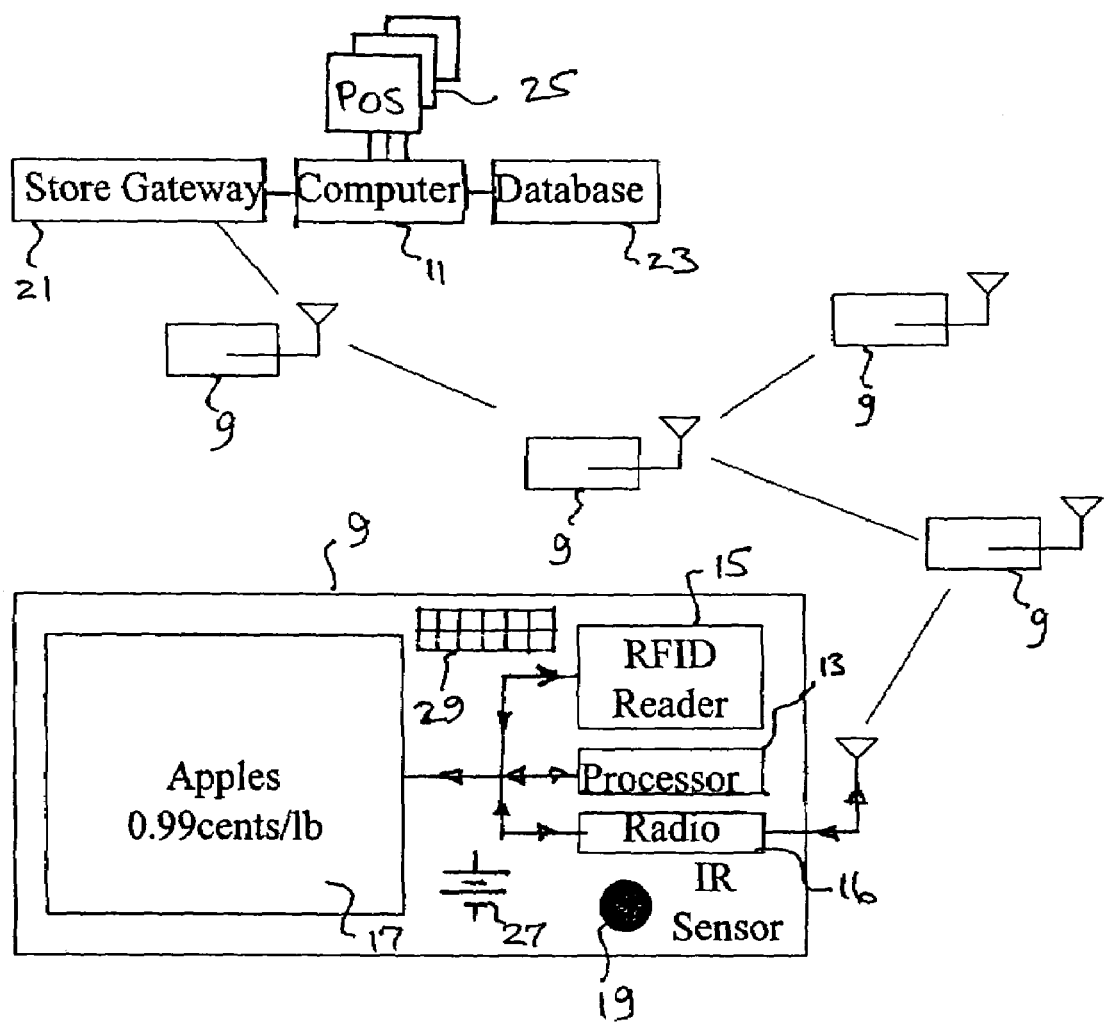
FIG. 1 is a pictorial block diagram of an adaptive network of modules in accordance with one embodiment of the invention.

Referring now to the pictorial block diagram of FIG. 1, there is shown a plural number of networked product modules 9 that may be physically distributed in spaced-apart array over an area or region remote from a central or main computer 11. The networked product modules may be specifically distributed, for example, among clusters of canned goods, or dairy products or fresh produce, or the like, within a retailing establishment such as a supermarket. Each module 9 includes an optional infra-red radiation sensor 19, and a processor 13 that controls operation of an RFID sensor 15, and may control an optional display 17, as later described herein. Each module 9 includes a communication channel 16 via radio link or other electromagnetic radiation for transmitting and receiving data signals between the networked product modules 9. The processor 13 in each module 9 is programmed to transmit to or receive and relay from adjacent modules 9 the data signals that are developed at each module 9. In this way, the plural number of modules 9 may interact with adjacent modules and form an adaptive network that links to the main or central computer 11, 21, 23. A transceiver 21 may serve as a gateway link via radio or other electromagnetic medium between the adaptive network of modules 9 and the central computer 11, 21, 23. Specifically, the RFID sensor in each module 9 responds to conventional RFID chips associated with selected objects, for example, canned goods or packaged produce, or the like, positioned on shelves at a supermarket proximate the selected objects. Such responsiveness may include transmission of a radio-frequency polling signal, say every 15 minutes, that excites the RFID chips which are associated with the selected objects in storage arrays disposed within the adjacent region of a module 9. Such polling signals initiate responsive radio-frequency emissions from adjacent RFID chips in known manner that contain various data about the associated objects. The RFID sensor 15 of a module 9 within range of a responding RFID chip thus receives data about objects associated with one or more responding RFID chips. Alternatively, such polling signals may occur at random time intervals associated with greater or lesser priorities of selected objects, and also to promote some simplification of data selection and processing through asynchronous or non-simultaneous communications.

The processor 13 of a module 9 controls the polling and collection of data from responding RFID's associated with objects in the adjacent vicinity (or, may be triggered via central computer 11, 21, 23 to so poll and collect data). The processor 13 also controls transmission of collected data via radio 16 (or via luminous radiation or other electromagnetic transmission medium) to adjacent modules 9.

The processor 13 in each module 9 is programmed also to receive data transmissions from adjacent modules for relay or retransmission to other of the modules 9. In this way, the plurality of modules 9 disposed in arrays spaced apart within ranges of about 10-30 meters thus assemble an adaptive network that links all modules 9 to the central computer 11, 21, 23. There, a database 23 that includes selected information about all objects tagged with RFID chips and that is linked to the central computer 11, 21, 23 greatly facilitates computer analyses of inventory, pricing, store location, and the like. At least pricing information and perhaps promotional offers on selected objects may be communicated to one or more point-of-sale terminals 25 to facilitate check out and completion of retail purchase transactions in conventional manner. The check-out procedure of identified objects also facilitates automated updating of the inventory of such objects within the database 23 in conventional manner as the sale transaction for each such object is completed.

In accordance with an embodiment of the present invention, an infra-red sensor 19 is incorporated into each module 9 to sense within a selected field of view the thermal presence of a customer at or near the location of a module 9. Thus, a module 9 positioned near a stored supply of objects such as fresh produce may determine the transient duration of a customer's presence near the stored supply of objects as useful information for analysis of the appeal of a display of the objects, or the like. The time duration of such sensed thermal presence forms a portion of the data that may be transferred over the adaptive network of modules 9 to the central computer 11, 21, 23 for further analyses. Of course, other proximity detectors of conventional design such as ultrasonic detectors may also be used to sense a customer's presence.

In addition, a computer-controlled display 17, for example, including a Liquid-Crystal Display (LCD) panel may be actuated by the processor 13 to display information such as price or unit value received by the processor 13 from the control computer 11, 21, 23 over the adaptive network formed by the plurality of modules 9. The processor 13 in each module 9, and therefore each module 9 has a unique address or identity code to which it responds as sensed in data signals communicated over the adaptive network of modules 9. In this way, a module 9 that has a unique address associated with its position adjacent a stored supply of fresh produce such as apples may serve as a communicator of price and description of the apples in the associated stored supply. And, such price information can be conveniently changed by the central computer 11, 21, 23, for example, after a predetermined interval of storage in order to increase demand and expedite the depletion of a stored supply of an object.

The electronic components of each module 9 are powered by batteries that may be charged from photovoltaic cells 31 in known manner for independent, stand-alone operation of each module 9. Thus, if any one module 9 fails to operate due to loss of battery power or other defect, the adaptive network of remaining operative modules 9 will re-configure to continue operating as a distributed network linked to central computer 11, 21, 23 that can then also identify the absent identification code of the inoperative module 9.

Additionally, new displays of objects with associated addressed modules 9 may be positioned within the region covered by the adaptive network of modules 9 to reconfigure the network to include the new modules 9 that then transmit and receive data signals between adjacent modules in the manner as previously described herein.

Figure 2:
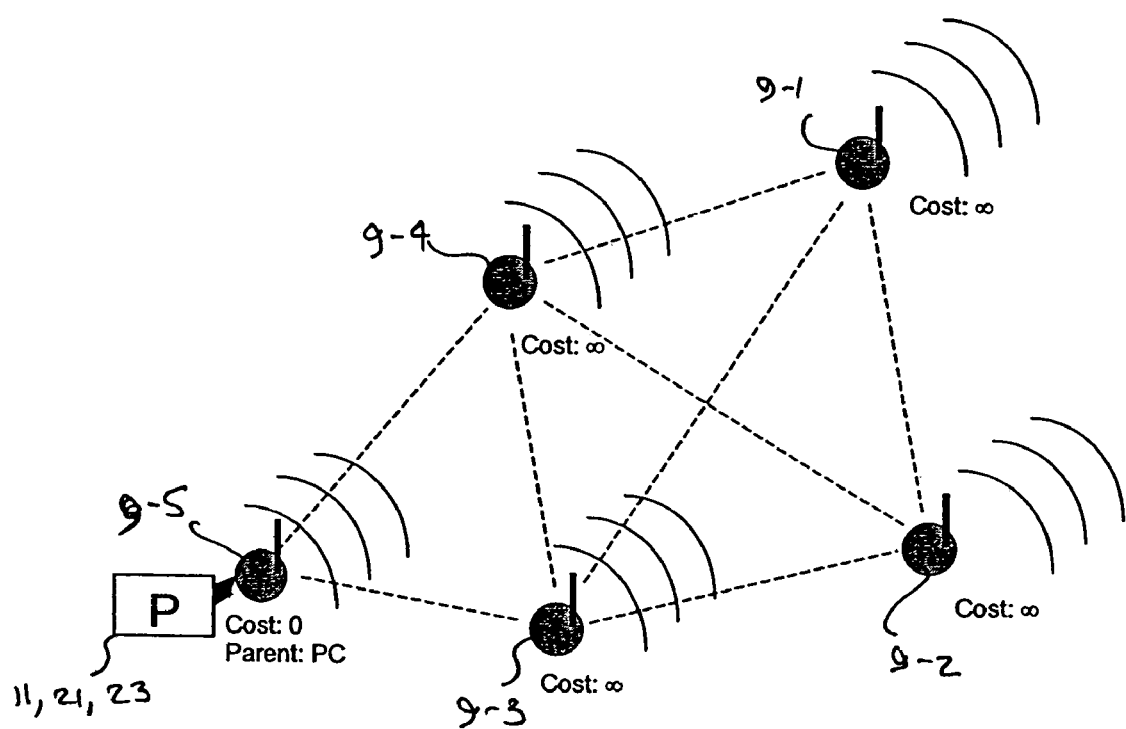
FIG. 2 is a pictorial illustration of a plurality of modules at spaced locations that are to adaptively assemble into a communication network.

Specifically, a network as illustrated in FIG. 2 may be configured, or reconfigured by addition to or removal from the array of an operative module, in a manner that promotes efficiencies in transmission and reception of data signals.

It may be helpful for understanding the formation of such a network to consider 'cost' as a value or number indicative of the amount of energy required to transmit a message to another receiving module (9-1 to 9-5). Higher cost translates, for example, into higher energy consumption from limited battery capacity in each module. In order for an adaptive network to form, a module (9-1 to 9-5) must select a parent or superior node to which to forward messages. The radio transmissions or beacons from neighboring modules (NM) informs a module about how well the NM's can hear its messages that include cost for the NM's to forward a message toward a base station, together with a 'hop' count (i.e., number of repeater or message relay operations) to such base station. This may not be enough information by which a module as a subordinate node can select a parent or superior node since a radio link may be highly asymmetrical on such two-way communications. Thus, a NM may receive clearly from a module but the module may not receive clearly from the NM. Selecting such NM as a parent would result in a poor communication link resulting in many message repeats and acknowledgements at concomitant cost.

However, such a module (9-1 to 9-5) can also overhear a NM's transmissions that include the NM's neighborhood list (NL) as a pre-set maximum number, say 16, of modules from which the NM can receive. For greater numbers of modules, the NM excludes from the NL those modules with poor or lower-quality quality reception. Thus, if a receiving module does not detect its broadcast address or ID in a potential parent's NL, then that NM will not be selected as a parent. A base station (e.g., 9-5 connected to central computer 11, 21, 23) may be set to accommodate a larger number of modules in its NL to handle more children or subordinate modules for greater prospects of assembling an efficient adaptive network through some selection of modules and relay operations therebetween.

Transmitted messages from a module (9-1 to 9-5) contain several factors, including:

a) cost, as a number to be minimized which indicates to NM's the amount of energy required to transmit to a base station. The cost is a summation of all costs of all 'hops' to the base station (a base station 9-5 has zero cost to forward messages, so its messages are distinctive from messages of possible parent modules); and b) the number of 'hops' to send a message to the base station; and c) a packet sequence number (e.g., 16-bit integer) that is incremented every time a message is transmitted from the base station 9-5 or other module 9-1 to 9-4; and d) a neighborhood list (NL) of all other modules in the vicinity from which the base station or other module can receive, including:

i) the ID of each NM; and ii) a reception estimate of how well a module receives messages from such NM as determined from processing the sequence numbers in such message packets to compute a percent of lost packets.

Therefore, a module (9-1 to 9-5) may calculate a probability factor (PF) of success in transmitting to a possible parent, as:

PF=(% of module's packets received by *NM*)×(% of possible parent's packets received by module).

Each module (9-1 to 9-4) may thus calculate its own cost (OC) of sending a message to the base station (9-5), as:

OC=cost of *NM/PF*.

A module selects lowest OC to sent a message.

As illustrated in FIG. 2, initialization of the network is facilitated by the base station (9-5) broadcasting a message including zero costs. In contrast, messages broadcast by all other modules (9-1 to 9-4) include infinite cost (since not yet determined how to route messages to the base station). And, there are no entries in the NL in initial broadcast messages. Data messages from a module are sent with a broadcast address since no parent has been selected. Modules (e.g., 9-3 and 9-4) that can receive base station messages from module 9-5 containing zero cost information will recognize that they can forward messages to such base station. Then, messages forwarded by modules 9-3 and 9-4 within the reception vicinity of the base station 9-5 enable the base station to assemble and include within their messages a NL of modules (including modules 9-3 and 9-4) that receive the base station messages. And, these modules then include the base station and other NM in their NL within broadcast messages. A parent (e.g., module 9-4) is then selected as a superior node by other modules as subordinate nodes whose messages each change from a broadcast address to the parent's address. The network formation thus propagates across the array to more remote nodes (e.g., modules 9-1 and 9-2) that are not in the reception vicinity of the base station 9-5.

Figure 3:
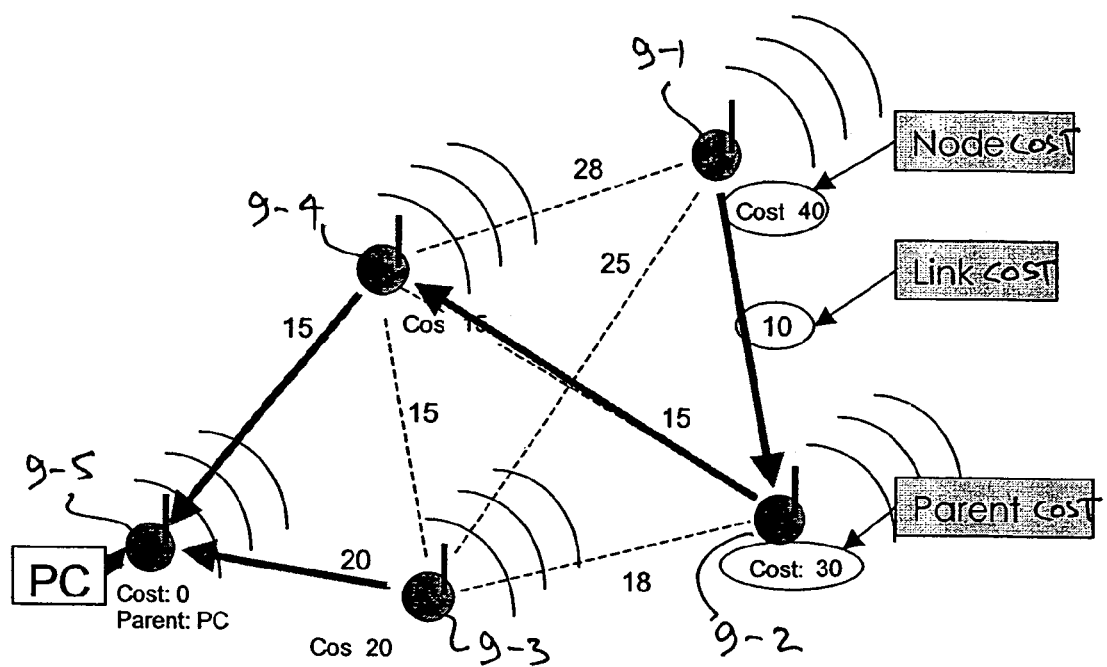
FIG. 3 is a pictorial illustration of the modules of FIG. 2 adaptively arranged into a communication network.

Thus, as illustrated in FIG. 3, each module (e.g., module 9-1) may calculate a node cost as the parent's cost plus the cost of the link to the parent (e.g., 9-2). Similarly, each communication link toward the base station (e.g., module 9-5) will be selected by lowest cost (e.g., via module 9-4 rather than via module 9-3) as the network adapts to the existing transmission conditions. In the event the cost parameters change, then a transmission path to the base station for a remote module will be selected on such lower cost (e.g., from module 9-2 via module 9-3, or from module 9-1 via module 9-4 or 9-3).

Figure 4:
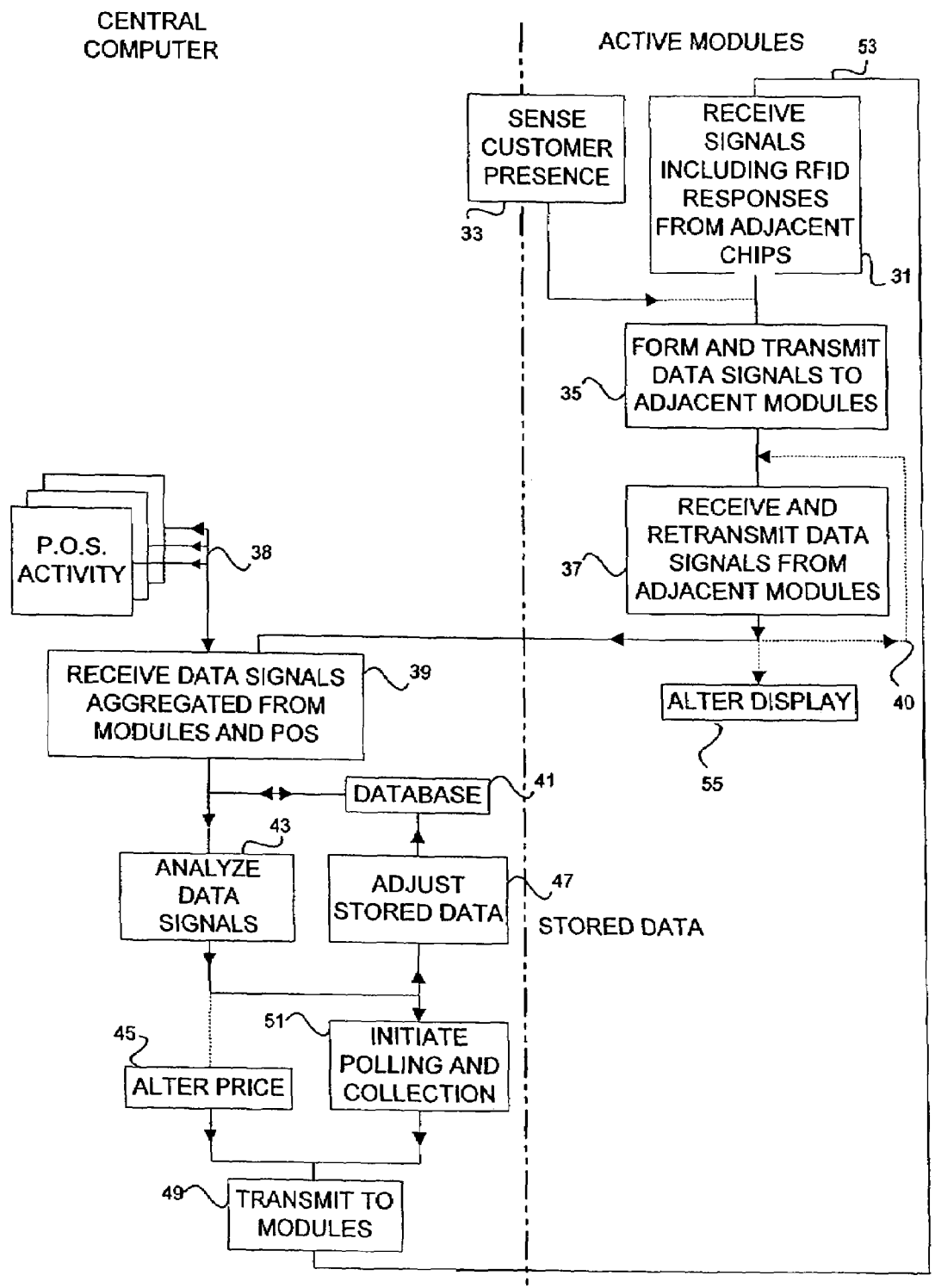
FIG. 4 is a flow chart illustrating operation of an adaptive network of modules in accordance with one embodiment of the present invention.

Referring now to the flow chart of FIG. 4, there is shown one operational embodiment of the present invention. Operational domains of the actual modules and of the central computer 11, 21, 23 are shown separately for clarity and simplification of explanation, although it should be noted that these operational domains operate simultaneously and interactively.

For convenience, consider that each of the modules 9 receives signals 31 from RFID chips in response to polling signals transmitted thereto from a module 9. The polling may be initiated at random intervals among the separate modules 9 either by independent operation of the associated processor 13 or under transmitted control signals from the central computer 11, 21, 23. In addition, each module may generate sensor information 33 about the duration of a customer's presence in the vicinity of a module 9. These signals received at the central computer 11, 21, 23 may indicate a change in the presence (or absence) of an RFID-tagged object as sensed during a previous polling, and optionally provide a time value of customer presence near a module 9. This information is formatted under control of the processor 13 in conventional manner for transmission 35 to adjacent modules. One or more adjacent modules may receive such transmitted information for retransmission 37 to one or more adjacent modules 9. This latter receipt and retransmission procedure may continue multiple times 40 throughout the network of modules 9, with each module also aggregating its collected data to transmit to adjacent modules. The data signals thus transmitted may include identifying information about each module along the distributed network that contributed data signals as received 39 by the central computer 11, 21, 23. One or more point-of-sale (POS) terminals interact 38 with the central computer during check-out procedures, for example, to select a check-out price as stored in the database 23, and to alter the total count 41 of objects stored as inventory in the database 23.

In accordance with an operating embodiment of the present invention, the data signals received by the central computer 11, 21, 23 may also include information about the duration of customer presence near a module for appropriate analysis 43, for example, regarding declining inventory count, or the like, to determine need for an altered price 45 on a selected object that then adjusts data about the object as stored in the database 23. In this way, the central computer 11, 21, 23 may then aggregate and transmit 49 to the modules 9 data and command signals, for example, including new price information to be displayed for selected objects by a proximate module of specific address, and including actuating signals 51 for a new polling cycle. The aggregated data and command signals thus transmitted by the central computer 11, 21, 23 include identification codes or addresses for each module in order to facilitate transmission through the distributed network of modules 9 of unique information to selected ones of the modules 9. As such transmitted signal arrives 53 at the module 9 to which it is addressed, that module transforms the data contained therein under control of the processor 13, for example, to an altered message for display 55 on the LCD display 17, or to a polling signal, or the like.

Therefore an adaptive network of modules assembled in accordance with the present invention greatly facilitates communication between a central computer, for example in a retailing establishment, and independent modules that are distributed about the establishment to gather and transfer data about RFID-tagged objects. In addition, such modules may serve as annunciators for displaying object information, and may also sense the duration of customer presence adjacent modules positioned in the vicinity of tagged objects. Logical processing of accumulated data gathered from interactive modules within the adaptive distributed network thus promotes convenient interaction with customers through alterations of displayed information about tagged objects.

What is claimed is:

1. A network including a plurality of modules, each module comprising:
   a transceiver of electromagnetic energy disposed to transmit and receive data signals between other of the plurality of modules;
   a sensor of radio-frequency identification signals;
   a detector for producing data signals representative of the duration of an object proximate the module;
   a processor coupled to the sensor and to the detector and to the transceiver for forming signals indicative of sensed radio-frequency identification signals and data signals for transmission by the transceiver to other of the plurality of modules; and the network including a controller disposed to receive and transmit signals between the controller and at least one of the plurality of modules.

2. The network of a plurality of modules according to claim 1, in which each transceiver includes different identification codes for each of the plurality of modules; and the controller includes a computer disposed to transmit and receive signals including identification codes and data signals between the computer and at least one of the plurality of modules for actuating a display panel on one of the plurality of modules in the network having an identification code included within a signal transmitted by the computer for producing on the display panel of the one module a visual indication of information representative of the signal including a data signal transmitted by the computer and received at the one module.

3. A method for computer-implementing a network of a plurality of modules that each operates to sense proximity of an object and to transmit and receive electromagnetic signals containing proximity-sensed data signals and radio-frequency identification signals, the method comprising:

transmitting from at least one of the plurality of modules data signals including a data signal indicative of the duration of sensed proximity, and radio-frequency identification signals for receipt by other of the plurality of modules to form a network of interactive modules that implements computer collection of the data signals.

4. A method according to claim 3 in which each of the plurality of modules includes a display and a different identification code, the method comprising:

computer-implementing transmission through reception and re-transmission among other of the plurality of modules of signals including data signals to one of the plurality of modules having a selected identification code signals for actuating display by the one module of information indicative of the transmitted data signals.

5. A method according to claim 3, in which at least one of the plurality of modules includes a display, the method comprising:

computer-implementing transmission to the at least one module of signals including said data signal representative of information to be displayed by the at least one module.

* * * * *